(12) United States Patent
Hawkins et al.

(10) Patent No.: US 7,337,243 B2
(45) Date of Patent: Feb. 26, 2008

(54) REDUNDANT SYSTEM MANAGEMENT CONTROLLERS

(75) Inventors: Peter A. Hawkins, San Luis Obispo, CA (US); Clyde S. Clark, Atascadero, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/211,322

(22) Filed: Aug. 24, 2005

(65) Prior Publication Data

US 2005/0283543 A1    Dec. 22, 2005

Related U.S. Application Data

(63) Continuation of application No. 10/094,629, filed on Mar. 12, 2002, now Pat. No. 6,948,008.

(51) Int. Cl.
*G06F 3/00* (2006.01)

(52) U.S. Cl. .............................. 710/14; 710/15; 710/17

(58) Field of Classification Search ............ 710/14–19; 714/100, 1–3, 5, 9, 10, 12, 13; 370/216, 370/219–221, 225

See application file for complete search history.

(56) References Cited

U.S. PATENT DOCUMENTS

| | | | |
|---|---|---|---|
| 6,487,463 B1* | 11/2002 | Stepp, III ..................... 700/79 |
| 6,957,353 B2* | 10/2005 | Bresniker et al. ........... 713/320 |
| 2002/0078207 A1* | 6/2002 | Iwamoto ..................... 709/226 |
| 2004/0117687 A1* | 6/2004 | Smith .......................... 714/13 |
| 2004/0225783 A1* | 11/2004 | Erickson et al. ............ 710/200 |

* cited by examiner

*Primary Examiner*—Donald Sparks
*Assistant Examiner*—David Martinez
(74) *Attorney, Agent, or Firm*—Robert A. Greenberg

(57) ABSTRACT

A module to perform system management for a computer. The module includes a memory to store management event information and a controller to operate in an active central management controller mode and in a standby central management controller mode. In both modes the controller sends system event information to another controller to duplicate the management event information.

15 Claims, 4 Drawing Sheets

REDUNDANT SYSTEM MANAGEMENT CONTROLLERS

The present application is a Continuation of application Ser. No. 10/094,629, filed Mar. 12, 2002 now U.S. Pat. No. 6,948,008.

FIELD OF THE INVENTION

Embodiments of the present invention relate to system management. In particular, embodiments of the present invention relate to the topology and operation of system management controllers.

BACKGROUND

Computers and other electronic systems contains various components that may malfunction during the life of the system. In order to reduce and/or remedy such malfunctions, some systems include built-in features such as the ability to monitor and control the "health" or performance of the system hardware. Such features are sometimes referred to as system management, but also may be referred to by other names such as management, hardware management, platform management, etc. System management features may include, for example, the monitoring of elements such as temperatures, voltages, fans, power supplies, bus errors, system physical security, etc. In addition, system management features may also include determining information that helps identify a failed hardware component, and issuing an alert specifying that a component has failed.

One of the components that may be used to handle system management functions is a system management controller (also referred to herein as a "controller"). A system management controller may be a microprocessor, micro-controller, application specific integrated circuit (ASIC), or other type of processing unit that controls system management tasks. A system management controller may perform tasks such as receiving system management information, sending messages to control system performance, logging system management information, etc. For example, a system management controller may receive an indication from a temperature sensor that system temperature is rising, may send a command to increase fan speed, and may log the temperature reading.

One of the controllers in a system may perform the role of the central system management controller for that system, in which case it may perform central system management functions such as for example logging events, collecting field replaceable unit (FRU) inventory information, user interface, etc. The central management controller for a system may be referred to as the central management controller (CMC) or the baseboard management controller (BMC) for the system. It is common for a system to have only one active central management controller. Other non-central management controllers may be referred to as satellite management controllers (SMCs). An SMC may perform system management for a particular part or feature of a system. For example, a computer system may contain a number of circuit boards and other components that are connected by busses, with one board containing a central management controller for that system and other boards containing SMCs that performs other system management functions. In this example, the SMC's may send event information (e.g., a temperature reading) to the central management controller, while the central management controller may log event information and handle management requests (e.g., a request to change a temperature sensor threshold).

DETAILED DESCRIPTION

Embodiments of the present invention provide a system with a standby central management controller in addition to an active central management controller. The standby central management controller ("standby-CMC") may monitor the active central management controller ("active-CMC") and may takeover the role of active-CMC if the active-CMC has failed. In embodiments, the system has two or more controllers that support active and standby modes. Embodiments of the present invention provide for the mirroring of management information between cental management controllers and for the handling of management requests received at a standby-CMC.

Figure 1:
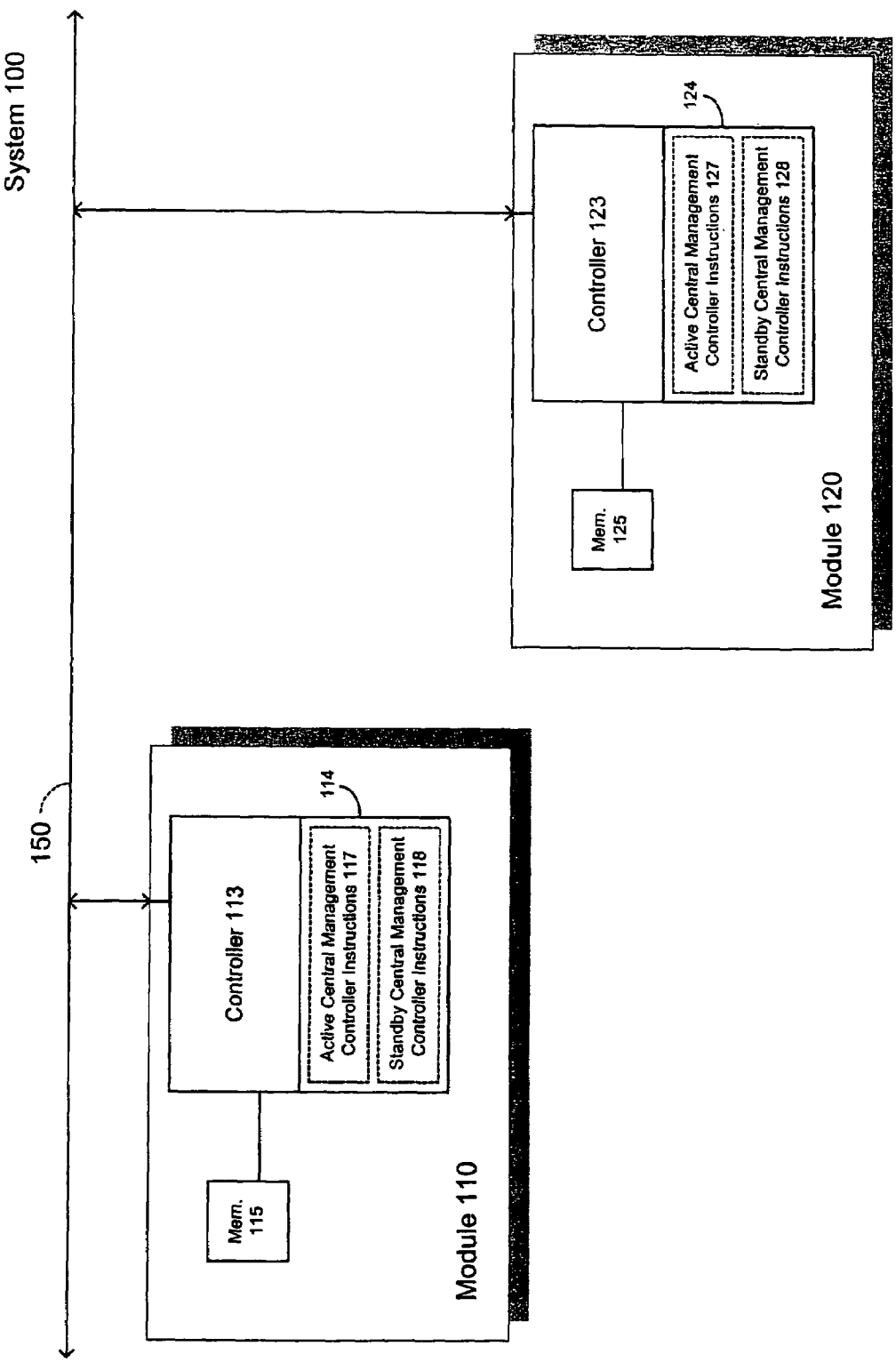
FIG. 1 is a block diagram of a system that has controllers with instructions to operate in an active central management controller mode and in a standby central management controller mode according to an embodiment of the present invention.

FIG. 1 is a block diagram of a system that has controllers with instructions to operate in an active-CMC mode and in a standby-CMC mode according to an embodiment of the present invention. FIG. 1 shows a system 100 that contains two modules 110 and 120. System 100 may be any type of electronic system such as a general purpose computer system, special purpose computer system, etc. Modules 110 and 120 which may be, for example, circuit boards that are inserted into slots of a system chassis. In an embodiment, modules 110 and 120 are field replaceable units (FRUs), in which case they may be replaceable in their entirety as part of a field service repair operation. Each of modules 110 and 120 may be a power supply, fan tray, CPU Board, or any other type of component. Of course, in other embodiments system 100 may contain more or less modules. The controllers in system 100 may each by coupled through an input/output port to a system management bus 150, which may be any type of bus that carries management information. The term coupled is intended to encompass elements that are directly connected or indirectly connected. Examples of system management bus 150 are an Inter-IC bus ($I^2C$) that conforms to the $I^2C$ Bus Specification developed by Philips Semiconductor Corporation, a System Management Bus (SMBus) which conforms to the SMBus Specification (Ver. 2.0, August 2000) of the SBS Implementers Forum, or an Intelligent Platform Management Bus (IPMB) which conforms to the Intelligent Platform Management Bus Communications Protocol Specification (Intel Corp. et al., v1.0).

Each module shown in system 100 contains a controller (113 and 123) and a computer readable medium (114 and 124). Each controller may be a processor that is capable of performing system management functions. Each computer readable medium may be any type of medium capable of storing instructions, such as a read only memory (ROM), a programable read only memory (PROM), or an erasable programable read only memory (EPROM). In an embodiment, the computer readable medium is a non-volatile memory. Each computer readable medium in FIG. 1 is shown storing active-CMC instructions (117 and 127) and standby-CMC instructions (118 and 128). These instructions may be, for example, software instructions, firmware instructions, microcode, or any other type of instructions that may be executed by the associated controller. Additional instructions may also be stored on one or more of the computer readable mediums and may be executed by the associated controller. In other embodiments, the controller and instructions may be implemented as an ASIC, a programable logic array (PLA), or any other type of processing arrangement.

Each module is shown as including a memory (115 and 125) that is coupled to the controller on that module (113 and 123). Memory (115 and 125) may be for example a volatile memory such as an SRAM, DRAM, etc., but may also be any other type of memory. In an embodiment, the memory (e.g., 115) that is associated with a controller (e.g., 113) may store management information that is used by the associated system management controller.

In an embodiment, the active-CMC instructions (e.g., 117) may be executed by a controller (e.g., 113) when that controller is in active-CMC mode and may perform active-CMC functions such as, for example, logging events, collecting field replaceable unit (FRU) inventory information, user interface, etc. In a further embodiment, the standby-CMC instructions (e.g., 128) may be executed by a controller (e.g., 123) when that controller is in standby-CMC mode to perform standby-CMC functions. For example, a standby-CMC may log a duplicate or mirror copy of the system management information stored in the memory that is associated with the active-CMC. In addition, a standby-CMC may monitor the active-CMC and, upon failure of the active-CMC, the standby-CMC may take over as the active-CMC. For example, controller 123 may be adapted to transition the controller 123 to active-CMC mode if the controller 113 is the active management controller for system 100 and the controller 123 determines that the controller 113 has failed.

According to embodiments of the invention, during operation, system 100 may have two-CMCs (113 and 123), one of which is an active-CMC and the other of which is a standby-CMC. Examples of such operation, including the mirroring of central management information and handling management requests by the standby-CMC, are discussed below with reference to FIGS. 2–4.

Figure 2:
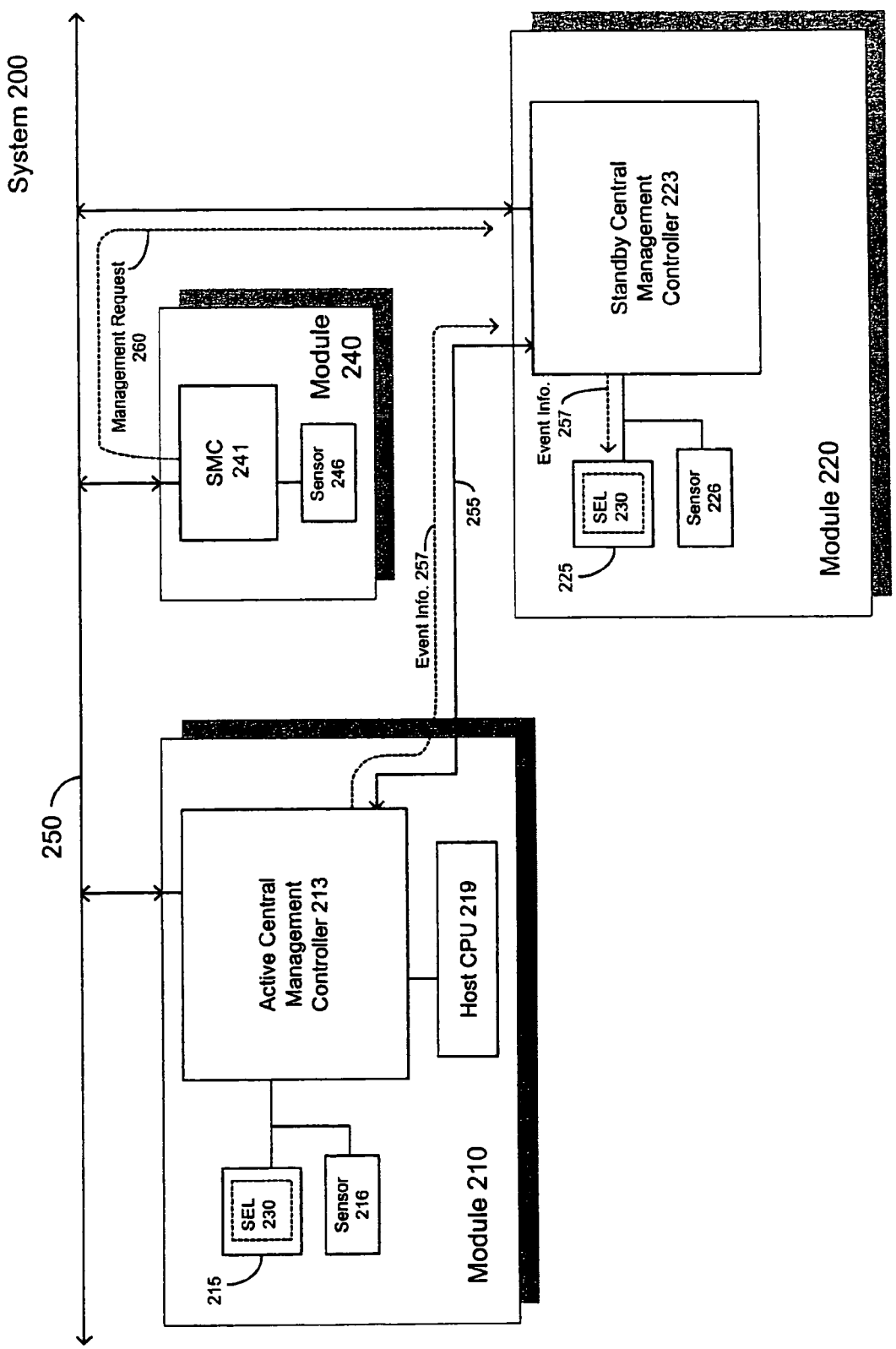
FIG. 2 is a block diagram of a system which includes an active central management controller and a standby central management controller according to an embodiment of the present invention.

FIG. 2 is a block diagram of a system 200 which includes an active-CMC and a standby-CMC according to an embodiment of the present invention. System 200 includes module 210, module 220 and system management bus 250 which may be the same as module 110, module 120, and system management bus 150 of FIG. 1. Modules 210 and 220 each also include a controller (213 and 223) which is coupled to system management bus 250 and which may be the same as controllers 113 and 123 of FIG. 1. The controller in each module is also shown coupled to an associated memory (215 and 225) which may be the same as memories 115 and 125 of FIG. 1. In addition, each of module 210 and 220 is shown in this embodiment as including a sensor (216 and 226) which may be for example a temperature sensor, voltage monitor, current monitor, intrusion sensor, fan tachometer, etc. As shown in FIG. 2, module 210 also includes a host central processing unit (CPU) 219 that is coupled to controller 213. Host CPU 219 may be any type of processor. In embodiments, host CPU 219 is connected to other components in system 200, such as for example a chip set, and may provide general processing functions for system 200. In an embodiment, module 220 also contains a host CPU that is associated with standby-CMC 223. In other embodiments, of course, modules 210 and 220 may each contain more or less sensors and more or less host CPUs.

In the embodiment shown, controller 213 is the active-CMC for system 200 and controller 223 is the standby-CMC for system 200. In this embodiment, active-CMC 213 performs active-CMC functions for system 200 and standby system management controller 223 performs standby system management functions for system 200. Standby-CMC 223 may monitor active-CMC 213 and, if active-CMC 213 should fail, standby-CMC 223 may takeover the role of active-CMC for system 200.

System 200 is also shown as including a module 240 that has a satellite management controller (SMC) 241 and a sensor 246. In the embodiment shown, SMC 241 is coupled to system management bus 250, and sensor 246 is coupled to SMC 241. SMC 241 may be a controller, such as controllers 213 and 223, that performs satellite management controller functions. For example, module 240 may be a fan tray and sensor 246 may be a fan speed sensor, in which case SMC 241 may monitor the fan speed and send event information to a CMC in system 200. In other embodiments, module 240 may contain more or less sensors, and system 200 may contain more or less satellite management controllers, each of which may be on separate modules.

FIG. 2 shows a dedicated connection 255 coupled to active-CMC 213 and standby-CMC 223. Connection 255 may be a bus such as system management bus 250 or may be any other type of connection such as an ethernet connection, serial connection, etc. Connection 255 may be coupled to an input/output port in module 210 and module 220. In an embodiment, connection 255 is dedicated to communication between active-CMC 213 and the standby-CMC 223. Connection 255 may be used to send system management information between active-CMC 213 and standby-CMC 223 so that, for example, they may be synchronized. In other embodiments, the system does not contain a dedicated connection, and system management information may be sent between CMCs using system management bus 250.

In an embodiment, the standby management controller may appear at the system management bus as a satellite management controller or, in a further embodiment, the controller may decline to send a response to a request at the system management bus (e.g., may not appear on the system management bus when in standby mode).

For purposes of illustration, FIG. 2 shows event information 257 being transmitted from active-CMC 213 to standby-CMC 223 over connection 255, and then being transmitted from standby-CMC 223 to memory 225. In addition, FIG. 2 shows a system event log 230 that is stored in both memory 215 and 225. System event log 230 may store a log of event information for system 200. In an embodiment, standby-CMC 223 executes instructions that cause the controller to receive a duplicate copy of management event information from active-CMC 113 and store the duplicate copy in a memory 225. For example, active-CMC 213 may receive an indication that an event as occurred in the system, either from a local sensor that is part of the same module (e.g., 216) or from a remote sensor such as one that is part of another module (e.g., 246). Active-CMC 213 may then store information for this event in SEL 230 in memory 215. In addition, active management controller 213 may forward a copy of the event information 257 to standby-CMC 223. Standby-CMC 223 may then store event information 257 in SEL 230 in memory 225. In this way, standby-CMC 223 maintains a duplicate or mirror copy of the system event log for system 200. If standby-CMC 223 receives information for an event that occurred locally with regard to the standby-CMC (e.g., from sensor 226), then standby-CMC 223 may store the event information in a local system event log of the standby-CMC (e.g., memory 225) and forward the event information to active-CMC 213. In embodiments, the duplicate copy of management event information may be sent over dedicated connection 255, and in further embodiments event information is forwarded from standby-CMC 223 to active-CMC 213 over dedicated connection 255.

In an embodiment, the standby-CMC also monitors the active-CMC for failure, in which case the standby-CMC may take over as the active-CMC. In an embodiment, the monitoring is implemented by periodically pinging the active-CMC. For example, standby-CMC 223 may periodically (e.g., every 1000 ms) send a signal to active-CMC 213, and standby-CMC 223 may determine that active-CMC 213 has failed if standby-CMC has not received an acknowledgment within a threshold amount of time (e.g., 100 ms) of sending the signal. In another embodiment, the active-CMC periodically sends a signal to the standby CMC, and the standby-CMC determines that the active-CMC has failed if the standby-CMC has not received a signal as expected (i.e., the standby-CMC is a passive monitor). In embodiments, after the standby-CMC has determined that the active-CMC has failed, the standby-CMC takes over as the active CMC for the system. For example, the standby CMC may change its address on the system management bus 250 to the active address or notify SMCs to send events to the address of controller 223.

FIG. 2 also shows a management request 260 being transmitted from satellite management controller 241 to standby-CMC 223. A management request may be a request a request for information to be sent or a request for the controller to take some action such as, for example, increase fan speed, change a temperature sensor threshold, reset a CPU, power cycle the system, etc. One or more management requests may be sent during system operation by a component in the system or from outside the system. For example, a user may request information remotely (e.g., from a local area network, modem, etc.), and this user may not aware of which controller is the active-CMC for the system. Management requests are generally processed (i.e., acted upon) by the active central management controller. In embodiments, when a management request is received at a port of the standby-CMC, the standby-CMC may transition to become the active-CMC (i.e., a failover may be initiated) and, after assuming the role of active-SMC, may then process the management request. For example, standby-CMC 223 of FIG. 2 may receive a management request (e.g., 260) from a requestor, may determine that the controller is not the active-CMC and, based on this determination, may cause a mode transition so that controller 223 becomes the active-CMC and controller 213 becomes the standby-CMC. In this example, controller 223 may process the management request after it has become the active-CMC. Controller 223 may then return a response to the requester. In an embodiment, controller 223 may then continue functioning as the active-CMC (and controller 213 may continue as the standby-SMC) until an incident causes another role change.

In another embodiment, the standby-CMC may send any management requests that it receives to the active-CMC be processed at the active-CMC. For example, standby-CMC 223 of FIG. 2 may receive a management request (e.g., 260) from a requestor, may determine that it (controller 223) is not presently the active-CMC and, based on this determination, may forward the management request for processing to active-CMC 213. Standby-CMC 223 may then receive an indication from active-CMC 213 that the management request has been processed and may send a response to the requestor.

Figure 3:
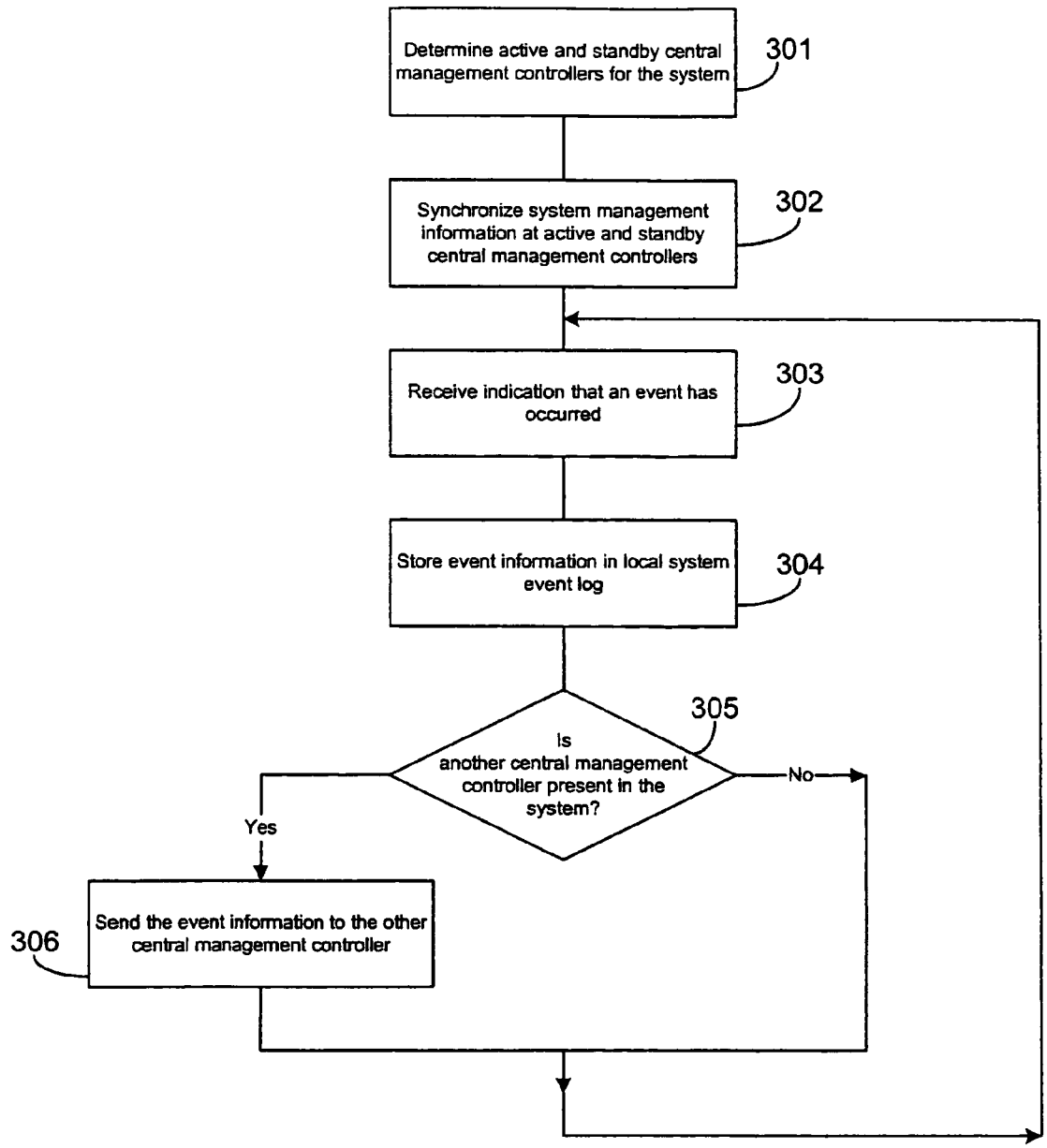
FIG. 3 is a flow diagram of a method of performing system management according to an embodiment of the present invention.

FIG. 3 is a flow diagram of a method of performing system management according to an embodiment of the present invention. This method may be performed, for example, by a system such as shown in FIG. 1. At some point, such as system start-up, one controller may determine that it is to be the active-CMC for the system and a second controller may determine that it is to be the standby-CMC for the system (301). The active-CMC may then synchronize the system management information with the standby-CMC (302). In an embodiment, such synchronizing comprises mirroring sensor data records, the system event log, and field replaceable unit inventory information between the first and second system management controllers. Sensor data records may contain information about the type, number and location of sensors in the platform, in addition to information on sensor threshold support, event generation capabilities, what types of readings the sensor provides, etc. FRU inventory information may include serial number, part number, asset tag, etc., for the FRU's in the system.

The active-CMC and standby-CMC may then continue to transmit event information between each other so that the SEL at each controller is current. As in the embodiment shown in FIG. 3, a controller may receive an indication that an event has occurred (303) and may store event information for that event in the local system event log (304). If the controller determines that the system has another central management controller (305), then the controller that received the event information may send the event information to that other central management controller (306). For example, when the active-CMC receives an indication that an event has occurred, it may store information relating to the event locally and forward a copy of the information to the standby-CMC. Similarly, when the standby-CMC receives an indication that a second event has occurred locally to the standby-CMC, the standby-CMC may store information relating to the second event locally at the standby-CMC and may forward a copy of the information to the active-CMC.

Figure 4:
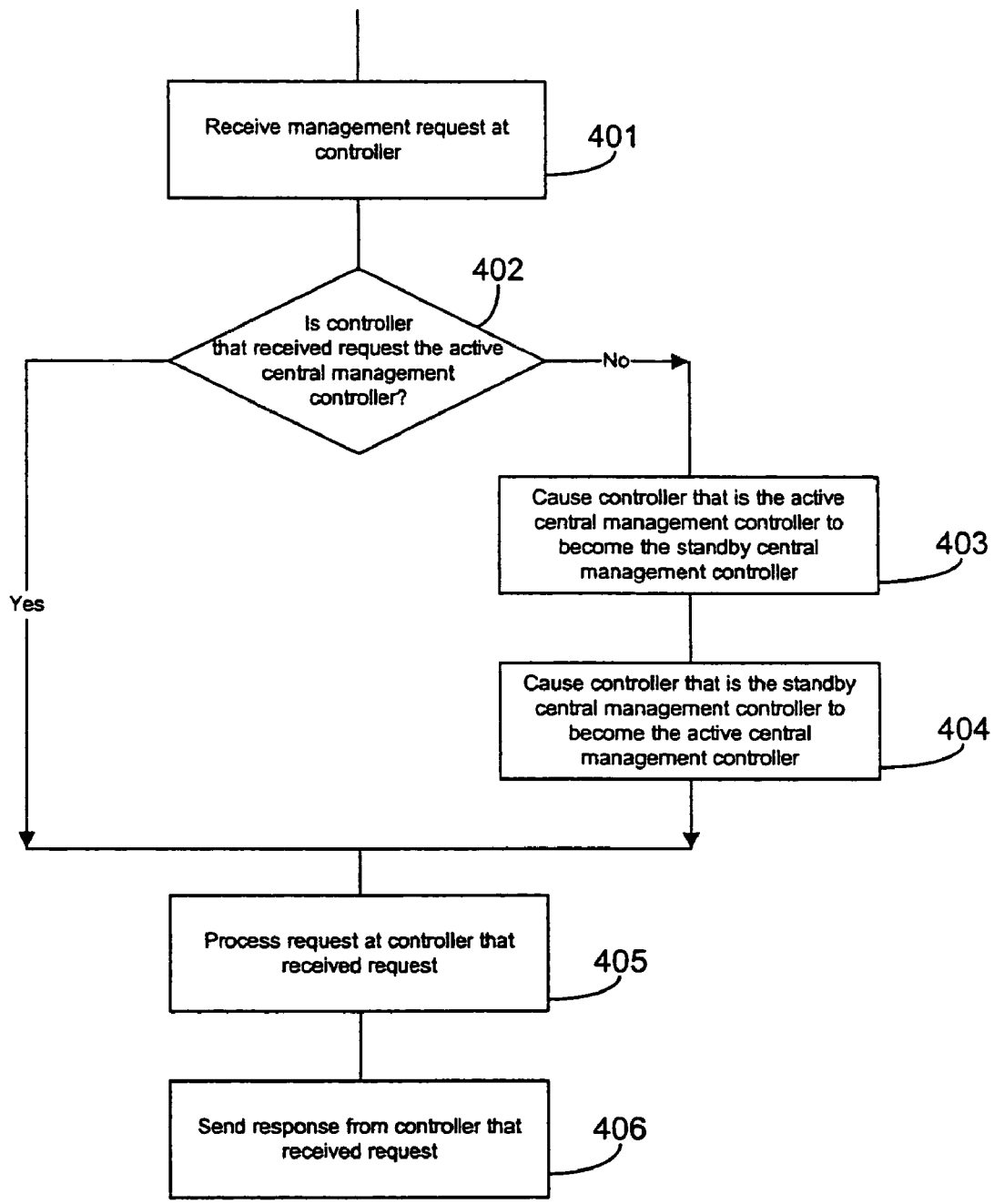
FIG. 4 is a flow diagram of a method of performing system management according to a further embodiment of the present invention.

FIG. 4 is a flow diagram of a further method of performing system management according to an embodiment of the present invention. This method may be performed, for example, before, during, or after the method shown in FIG. 3. In the embodiment shown in FIG. 4, at some point a management request is received at a controller (401), which controller determines whether it is the active-CMC (402) and, if not, the controller that received the request causes a failover so that the active-CMC becomes the standby-CMC (403) and the standby-CMC becomes the active-CMC (404). The controller which receives the request may then process the request as the active-CMC (405), either because it was the active-CMC when the request was received or because a failover has been completed, and may send a response (406). In some cases, for example, a standby-CMC may receive a management request from an entity that is external (e.g., from a user) and that does not know which controller is the active-CMC. In another embodiment, when a management request is received at a controller, the controller determines whether it is the active-CMC. If it is the active-CMC, the controller processes the request. If it is not the active-CMC, the controller that received the request sends the request to the active-CMC. The active-CMC may then process the request and send a response to the controller that received the request (i.e., the standby-CMC), and upon receipt of this response the standby-CMC may send the response to the requestor.

Embodiments of the present invention provide a subsystem that includes an active central management controller, which performs central system management functions, and a standby central management controller, which acts as a back-up in case of failure of the active central management controller. According to these embodiments, the system management functions will be reliably performed even when the active system management controller fails. Several embodiments of the present invention are specifically illustrated and/or described herein. However, it will be appreciated that modifications and variations of the present invention are covered by the above teachings and within the purview of the appended claims without departing from the spirit and intended scope of the invention. For example, the system management functions may be implemented as a hardware circuit or in software instructions and the order of execution of steps and instructions that are shown herein may be varied.

What is claimed is:

1. A module to couple to a computer system, the module comprising:
   a sensor resident on the module to detect and output event information;
   a controller to couple via a system management bus to an other controller resident on an other module in the computer system;
   a memory coupled to the controller, the memory to include:
      instructions to determine whether the controller is to be an active or a standby system management controller for the computer system;
      instructions to be executed by the controller if the controller is to be an active system management controller, the instructions be executed by the controller if the controller is to be an active system management controller to include:
         the controller to log a system event;
         the controller to collect system field replaceable unit inventory information;
         the controller to forward system management information to a standby system management controller; and
         the controller to process a management request;
      instructions to be executed by the controller if the controller is to be a standby system management controller; and
      a system event log to include system event information, the system event information to include the event information detected by the sensor.

2. A module according to claim 1, wherein the instructions to be executed by the controller if the controller is to be a standby system management controller include:
   the controller to mirror system management information maintained by a given active system management controller;
   the controller to detect a failure of the given active system management controller; and
   the controller to transition to become an active system management controller based on detection of the failure of the given active system management controller.

3. A module according to claim 2, wherein detecting the failure of the given active system management controller comprises the controller sending a signal to the given active system management controller and determining that the given active system management controller has failed based on not receiving an acknowledgment of the signal from the given active system management controller within a given amount of time.

4. A module according to claim 2, wherein detecting the failure of the given active system management controller comprises the controller receiving a management request and determining that the given active system management controller has failed based on receipt of the management request.

5. A module according to claim 1, wherein the system management bus comprises an Intelligent Platform Management Bus.

6. A module according to claim 1, wherein the system event information also includes event information detected by an other sensor coupled to the computer system.

7. A module according to claim 1, wherein the controller to process a management request comprises at least one action selected from the following group of: the controller to change a fan speed, the controller to change a temperature sensor threshold, the controller to reset a central processing unit and the controller to power cycle the computer system.

8. A module according to claim 1, wherein system management information forwarded to a standby system management controller includes at least one selected from the following group of: a sensor data record, an event log and a field replaceable unit inventory.

9. A method according to claim 8, wherein the sensor data record includes:
   a location of one or more sensors in the computer system;
   an event generation capability of the one or more sensors; and
   a type of reading the one or more sensors provide.

10. A computer system comprising:
    one or more sensors to detect and output event information;
    a first module to include a first controller and a memory associated with the first controller, the first controller to function as an active system management controller for the computer system, the memory associated with the first controller to include instructions to be executed by the first controller to function as an active system management controller, the active system management controller functions to include:
       logging a system event;
       collecting system field replaceable unit inventory information;
       forwarding system management information to a standby system management controller for the computer system; and
       processing a management request;
    a second module to include a second controller and a memory associated with the second controller, the second controller to function as a standby system management controller for the computer system; and
    a system management bus to couple the first controller on the first module to the second controller on the second module, the first controller to forward system management information to the second controller, the second controller to maintain the system management information in the memory associated with the second controller to mirror the system management information, wherein the system management information includes the event information received from the one or more sensors.

11. A computer system according to claim 10, wherein the memory associated with the second controller includes instructions to be executed by the second controller to function as a standby system management controller, the standby system management controller functions to include:
   mirroring system management information received from a given active system management controller; and
   detecting a failure of the given active system management controller; and
   transitioning to become an active system management controller based on detecting the failure of the given active system management controller.

12. A computer system according to claim 10, wherein processing a management request comprises at least one action selected from the following group of: changing a fan speed, changing a temperature sensor threshold, resetting a central processing unit and power cycling the computer system.

13. A computer system according to claim 10, the active system management controller functions to further include periodically sending a signal to a standby system management controller, wherein the second controller functioning as a standby system management controller for the computer system is to determine whether the first controller functioning as the active system management controller has failed based on the second controller not receiving the signal when the signal was expected.

14. A computer system according to claim 10, wherein forwarding system management information to a standby system management controller for the computer system comprises the system management information including at least one selected from the following group of: a sensor data record, an event log and a field replaceable unit inventory.

15. A computer system according to claim 14, wherein the sensor data record includes:
   a location of the one or more sensors in the computer system;
   an event generation capability of the one or more sensors in the computer system; and
   a type of reading the one or more sensors in the computer system provide.

* * * * *